(12) United States Patent
Zhou (10) Patent No.: US 11,331,542 B1
(45) Date of Patent: May 17, 2022

(54) LUMINOUS BALL AND METHOD OF MANUFACTURING THE SAME

(71) Applicant: Manna Zhou, Zaoyang (CN)

(72) Inventor: Manna Zhou, Zaoyang (CN)

( * ) Notice: Subject to any disclaimer, the term of this patent is extended or adjusted under 35 U.S.C. 154(b) by 0 days.

(21) Appl. No.: 17/203,907

(22) Filed: Mar. 17, 2021

(51) Int. Cl.
*A63B 43/06* (2006.01)
*A63B 41/02* (2006.01)
*A63B 41/08* (2006.01)
*B29D 22/04* (2006.01)
*F21V 33/00* (2006.01)

(52) U.S. Cl.
CPC ............. *A63B 43/06* (2013.01); *A63B 41/02* (2013.01); *A63B 41/08* (2013.01); *B29D 22/04* (2013.01); *F21V 33/008* (2013.01); *A63B 2209/00* (2013.01); *A63B 2225/74* (2020.08)

(58) Field of Classification Search
CPC ......... A63B 43/06; A63B 41/02; A63B 41/08; A63B 2209/00; A63B 2225/74; F21V 33/008; B29D 22/04
See application file for complete search history.

(56) References Cited

U.S. PATENT DOCUMENTS

| | | | | |
|---|---|---|---|---|
| 5,102,131 A * | 4/1992 | Remington | ............ | A63B 43/06 473/570 |
| 5,639,076 A * | 6/1997 | Cmiel | ............ | A63B 43/06 362/806 |
| 5,669,702 A * | 9/1997 | Wang | ............ | A63B 43/06 362/234 |
| 5,725,445 A * | 3/1998 | Kennedy | ............ | A63B 43/06 473/570 |
| 5,775,800 A * | 7/1998 | Hsieh | ............ | F21V 33/008 362/295 |
| 6,251,035 B1 * | 6/2001 | Fa | ............ | A63B 41/00 473/570 |
| 6,537,125 B1 * | 3/2003 | Motosko, III | ............ | A63B 43/04 446/220 |
| 7,520,830 B2 * | 4/2009 | Wong | ............ | A63B 43/04 473/594 |

(Continued)

FOREIGN PATENT DOCUMENTS

CN 213407656 U * 6/2021
WO WO-2016148764 A1 * 9/2016 ............. A63B 41/00

*Primary Examiner* — Steven B Wong (57) ABSTRACT

The present disclosure provides a luminous ball and relates to the technical field of ball products. The luminous ball includes a bladder and an outer cover. The bladder is provided with a plurality of first fixing blocks therein. A side of each of the plurality of first fixing blocks is hinged with a telescopic device. Output ends of the telescopic devices are hinged with a gravity ball. The gravity ball is provided with a first rectangular slot therein. According to the present disclosure, one side of the first fixing block is hinged with a telescopic device, such that during the movement of the ball, the gravity ball can expand and retract, and the movement of the gravity ball is facilitated. Through the hinging the telescopic device with the first fixing block and the gravity ball, the movement of the gravity ball in any direction inside the bladder is facilitated. A stopper between a first rectangular slot and a retaining block can buffer a first circular opening to a certain extent during the movement of the gravity ball. The structure of this product greatly improves the water resistance, and the battery can be replaced.

10 Claims, 8 Drawing Sheets

(56) References Cited

U.S. PATENT DOCUMENTS

| | | | |
|---|---|---|---|
| 8,512,177 B2* | 8/2013 | Krysiak | A63B 24/0021 |
| | | | 473/570 |
| 10,806,972 B1* | 10/2020 | Lin | A63B 43/004 |
| 2003/0224885 A1* | 12/2003 | Leal | A63B 43/06 |
| | | | 473/570 |
| 2010/0069181 A1* | 3/2010 | Lin | A63B 43/06 |
| | | | 473/570 |
| 2012/0244969 A1* | 9/2012 | Binder | A63B 21/0055 |
| | | | 473/570 |
| 2016/0074714 A1* | 3/2016 | Krysiak | A63B 45/00 |
| | | | 473/570 |
| 2016/0243410 A1* | 8/2016 | Larson | F21V 23/0442 |
| 2016/0354646 A1* | 12/2016 | Wang | A63B 41/00 |
| 2017/0246513 A1* | 8/2017 | Fang | A63B 41/00 |

* cited by examiner

LUMINOUS BALL AND METHOD OF MANUFACTURING THE SAME

TECHNICAL FIELD

The present disclosure relates to the technical field of ball products, and more particularly, to a luminous ball and a method of manufacturing the same.

BACKGROUND

Various balls usually include an outer cover and an interior. The outer cover forms the outer part of a sports ball, and is usually formed by joining together (for example, by stitching, adhesive, or gluing) a plurality of durable and wear-resistant outer cover pieces along adjacent edge regions (i.e., by seams). Design and other aesthetic elements can be applied to the outer surface of the outer cover.

The existing ball is not easy to be noticed by the user when the ball is used at dusk or at night, which affects the user's observation of the ball's trajectory and judgment of the ball's position, and at the same time, it is easy to injure people around.

SUMMARY

The present disclosure aims to provide a luminous ball and a method of manufacturing the same. Through hinging a telescopic device to one end of a first fixing block, the gravity ball can expand and contract during the movement of the ball, which facilitates the movement of the gravity ball, and solves the existing problem.

In order to solve the above technical problems, the present disclosure is implemented through the following technical solutions.

A luminous ball includes a bladder and an outer cover. The bladder is provided with a plurality of first fixing blocks therein. A side of each of the plurality of first fixing blocks is hinged with a telescopic device, output ends of the telescopic devices are hinged with a gravity ball. The gravity ball is provided with a first rectangular slot therein. A retaining block is provided inside the first rectangular slot. A stopper is installed between the retaining block and the first rectangular slot. The retaining block is provided with a first circular opening therein, and a positioning chip is installed inside the first circular opening.

An exterior side of the bladder is provided with a bag, an end of the bag is located inside the bladder. A sleeve is provided in the bag, and an inner side of the sleeve is provided an internal thread.

The internal thread of the sleeve is engaged with a flashlight device. An outer surface of the flashlight device is provided with an external thread. The outer surface of the flashlight device is provided with two first slots, and each of the two first slots is provided with a V-shaped limiting paddle therein. The inner side of the sleeve is provided with a positioning groove corresponding to the V-shaped limiting paddle. The V-shaped limiting paddle is slidably fitted in the positioning groove, and the two V-shaped limit paddles are symmetrically arranged on the outside of the flashlight device.

Embodiments of the present disclosure further provides a method of manufacturing the above-described luminous ball. The method may include the following operations:

step 1, processing rubber: placing the rubber on an extrusion device for processing;

step 2, cutting rubber: after folding a rubber sheet for a plurality of times, sticking a plurality of reinforcing connecting lines at centers of the rubber sheets, placing the rubber sheets on a cutting mold, and using a pressing device to cut the rubber sheets through the cutting mold;

step 3, sticking an air nozzle: making a hole on one of the rubber sheets having been cut, applying glue on an edge of the hole, and inserting the air nozzle into the hole step 4, heating: placing the rubber sheets in a spherical cabin, then fixing the first fixing block (17) inside the rubber sheet, using an inflator to inflate the rubber sheet in the spherical cabin, making the spherical cabin heat the rubber sheet, and making the rubber sheet into a bladder, wherein in the process of processing the bladder, a corresponding space is reserved according to the shape of the bag (3), and then a corresponding device is installed in the bag (3);

step 5, winding: placing the bladder on a winding device and causing the winding device to wrap nylon threads on the bladder;

step 6, sticking the outer cover: laying a plurality of outer cover pieces (2) that have been cut in advance in the spherical cabin, placing the wound bladder (1) in the outer cover (2), and inflating the bladder with an inflator to cause the sleeve (4) of the spherical cabin to heat the outer cover (2) so that the outer cover (2) is stuck to the bladder (1); and step 7, packing: deflating the processed ball, causing a compression device of the bag (3) to reduce air in the ball, and packing the ball with a packing bag.

The embodiments of the present disclosure have the following beneficial effects.

In embodiments of the present disclosure, a side of the first fixing block is hinged with a telescopic device, such that during the movement of the ball, the gravity ball can expand and retract, and the movement of the gravity ball is facilitated. Through the hinging the telescopic device with the first fixing block and the gravity ball, the movement of the gravity ball in any direction inside the bladder is facilitated. A stopper between a first rectangular slot and a retaining block can buffer a first circular opening to a certain extent during the movement of the gravity ball. The structure of this product greatly improves the water resistance, and the battery can be replaced.

DESCRIPTION OF EMBODIMENTS

In order to illustrate description of the embodiments of the present invention clearly and concisely, the present disclosure omits detailed descriptions of known functions and known components.

Please refer to FIG. 1 to FIG. 8, an embodiment of the present disclosure provides a luminous ball. The luminous ball includes a bladder 1 and an outer cover. The bladder 1 is provided with a plurality of first fixing blocks 17 therein. A side of each of the plurality of first fixing blocks 17 is hinged with a telescopic device 19. Output ends of the telescopic devices 19 are hinged with a gravity ball 18. The gravity ball 18 is provided with a first rectangular slot 20 therein. The first rectangular slot 20 is provided with a retaining block 21 therein. A stopper 22 is installed between the retaining block 21 and the first rectangular slot 20. A first circular opening 23 is provided inside the retaining block 21, and a positioning chip is installed inside the first circular opening 23.

Figure 6:
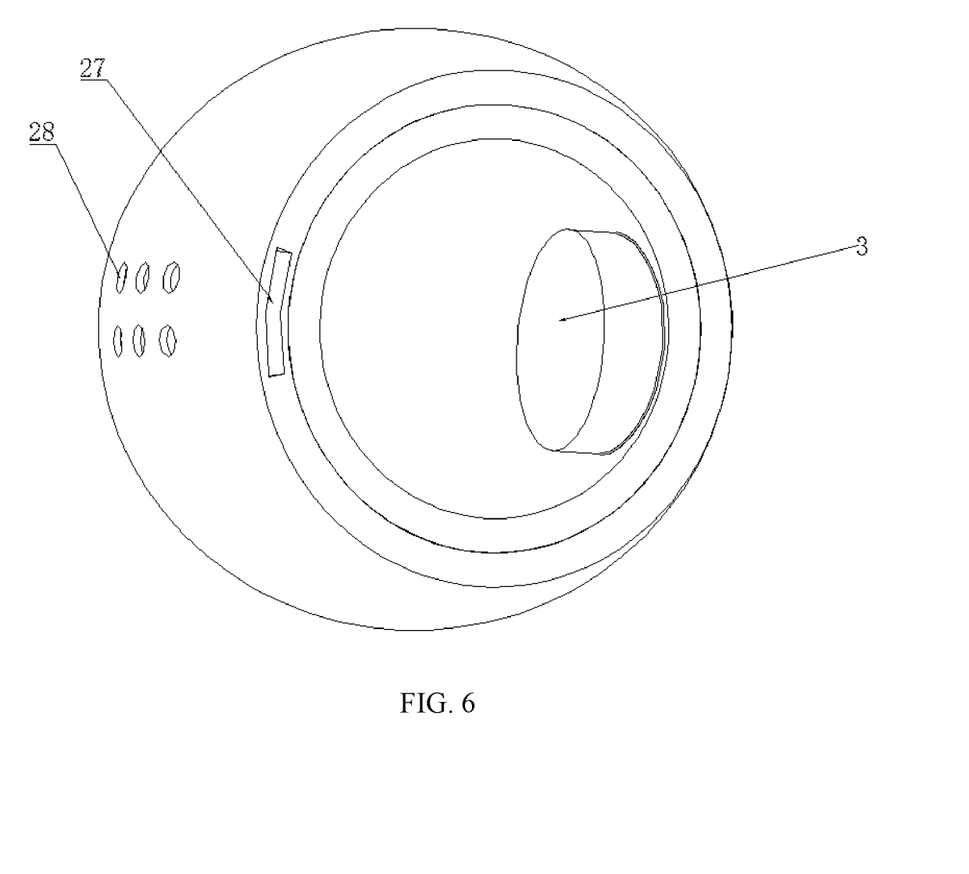
FIG. 6 is a structural schematic perspective view of a bag according to an embodiment of the present invention.
Figure 7:
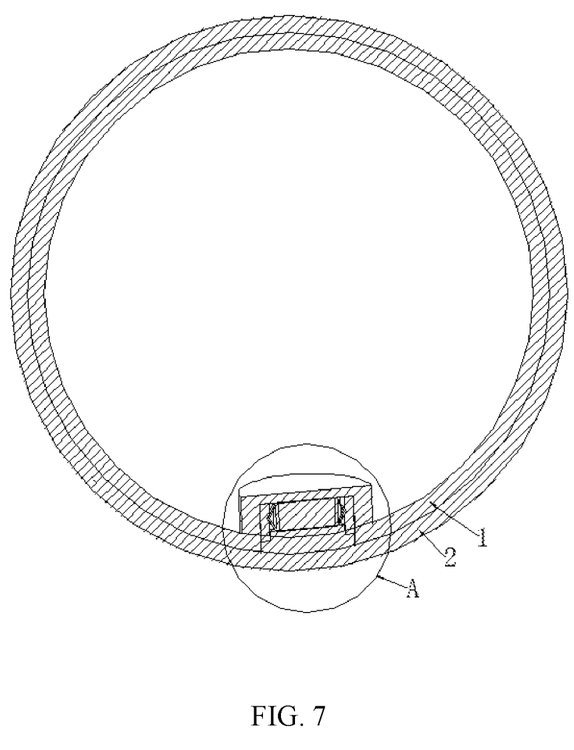
FIG. 7 is structural schematic sectional view of a bag according to an embodiment of the present invention.

An exterior side of the bladder 1 is provided with a bag 3, and an end of the bag 3 is located inside the bladder 1. A sleeve 4 is provided in the bag 3, and an inner side of the sleeve 4 is provided an internal thread.

Figure 8:
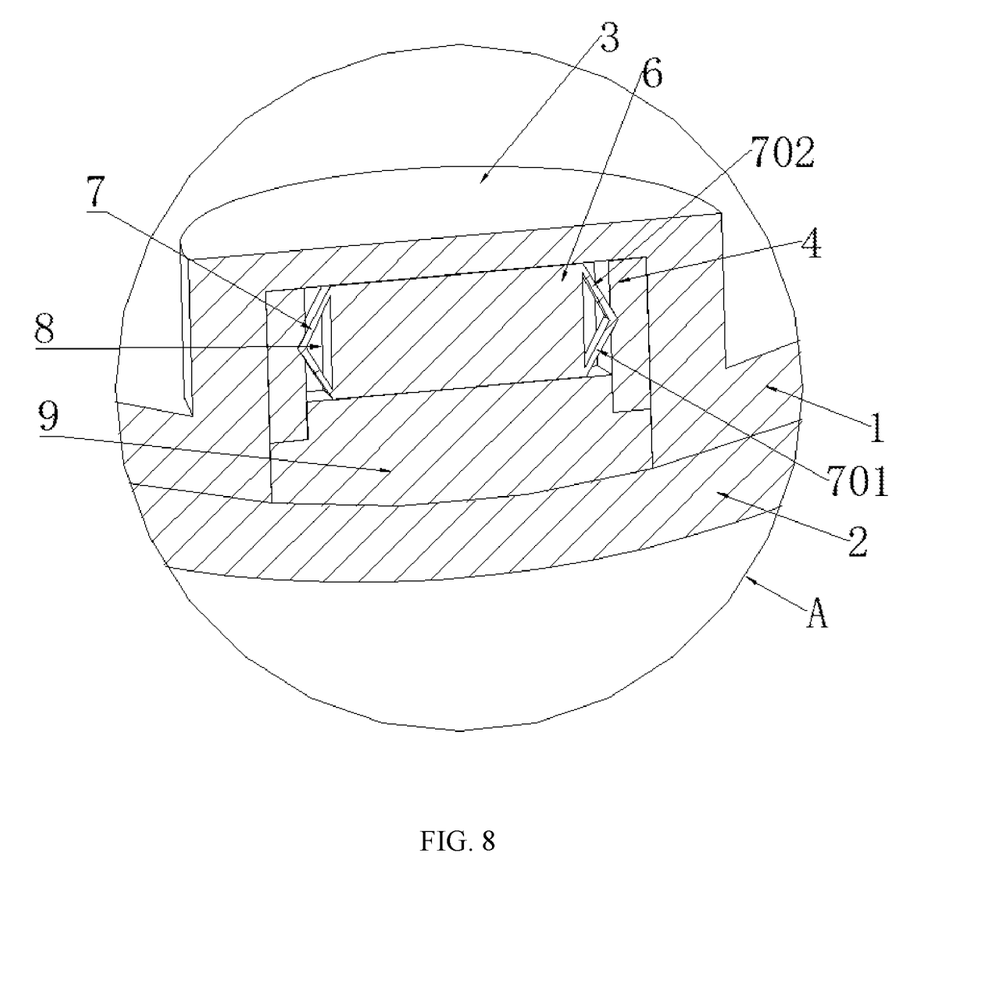
FIG. 8 is a structural schematic view of a region A in FIG. 7.

The internal thread of the sleeve 4 is engaged with a flashlight device 6. An outer surface of the flashlight device 6 is provided with an external thread. The outer surface of the flashlight device 6 is provided with two first slots. Each of the two first slots is provided with a V-shaped limiting paddle 7. The inner side of the sleeve 4 is provided with a positioning groove 8 corresponding to the V-shaped limiting paddle 7. The V-shaped limiting paddle 7 is slidably fitted in the positioning groove 8. The two V-shaped limit paddles 7 are symmetrically arranged on the outside of the flashlight device 6.

Figure 1:
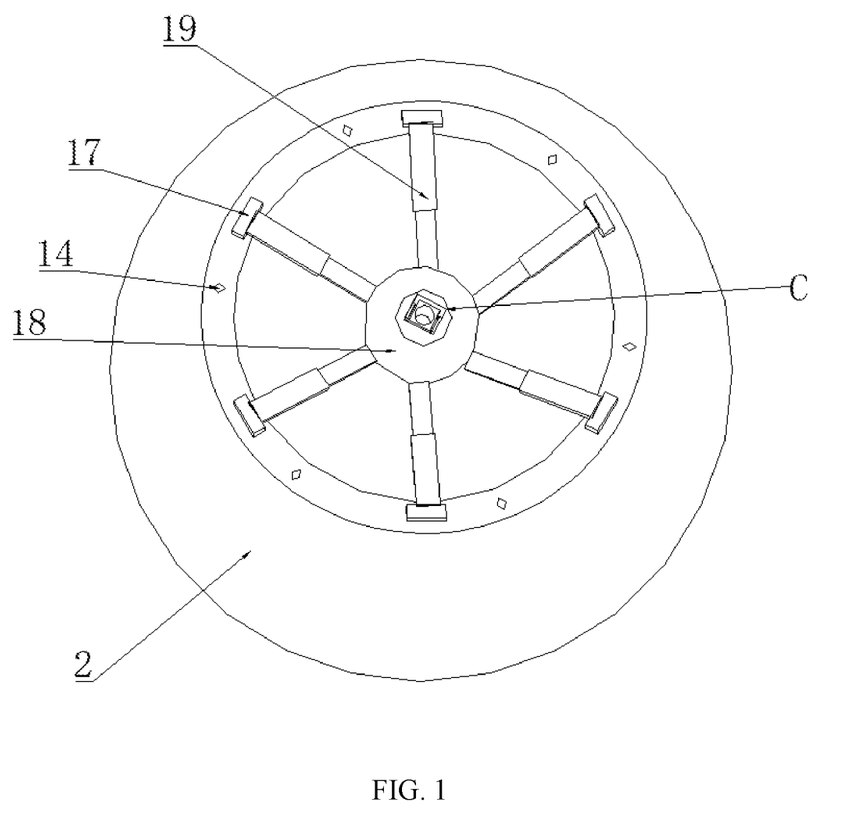
FIG. 1 is a structural schematic perspective view according to an embodiment of the present invention.

One aspect of the application of the present embodiment is as follows. During usage, a soccer ball is kicked, the gravity ball 18 in the soccer ball will generate corresponding vibrations, so that the gravity ball 18 can drive the telescopic device 19 to expand and retract. Since the telescopic device 19 is hinged with the first fixing block 17 and the gravity ball 18, the gravity ball 18 can move in any direction in the soccer ball during the movement, so that the first circular opening 23 in the first rectangular slot 20 will also vibrate. When the circular opening 23 vibrates, the stopper 22 will buffer the first circular opening 23 to a certain extent. The flashlight device 6 is rotated in the sleeve 4, and the V-shaped limiting paddle 7 moves downwards. When the V-shaped limiting paddle 7 moves into the positioning groove 8, a rubber plug 9 can be positioned, and the V-shaped limiting paddle 7 can be forced out, by using a metal sheet, from the positioning groove 8 along a first groove channel. Next, the flashlight device 6 can be rotated, and then the flashlight device 6 can be taken out. When the soccer ball is kicked, a lamp bead 10 will also generate light under the action of a button battery 29.

Since the telescopic device 19 is hinged with one side of the first fixing block 17, the expanding and retracting of the gravity ball 18 can be facilitated during the movement of the ball, and the movement of the gravity ball 18 is facilitated. Through the hinging of the telescopic device 19 with the first fixing block 17 and the gravity ball, the movement of the gravity ball 18 in any angle inside the bladder 1 is facilitated. During the movement of the gravity ball 18, the stopper 22 between the first rectangular slot 20 and the retaining block 21 can provide certain cushioning for the first circular opening 23 to reduce the damage to the objects in the first circular opening 23. The first fixing block 17 installed on the upper side of a second fixing block 16 can buffer the lamp bead 10 to a certain extent during the movement of the ball, and thus the damage of the lamp bead 10 is reduced during the using of the ball, and the service life of the lamp bead 10 is prolonged. The lamp bead 10 can be easily replaced by snapping the latching strip 25 inside the limiting block 26. The flashlight device 6 is matched with the internal thread of the sleeve 4, which facilitates the rotation of the flashlight device 6 into the sleeve 4. At the same time, it can protect a power supply device of the flashlight device 6 from being corroded by water. The outer surface of the flashlight device 6 is provided with two first slots, and each of the two first slots is provided with the V-shaped limiting paddle 7. In this way, it is convenient to limit the flashlight device 6 in the sleeve 4 after rotating the flashlight device 6, and the possibility of the flashlight device 6 falling off and detaching from the ball during the use of the ball is reduced. The positioning groove 8 corresponding to the V-shaped limiting paddle 7 is provided inside of the sleeve 4, which facilitates removal the V-shaped limiting paddle 7 from the positioning groove 8 and thus facilitates rapid positioning and removal of the flashlight device 6, such that the internal power supply battery of the flashlight device 6 can be conveniently replaced.

In one embodiment, the V-shaped limiting paddle 7 includes a first board body 701 and a second board body 702, a first end of the first board body 701 and a first end of the second board body 702 are engaged in a fixed manner, a second end of the first board body 701 is close to an open section of the first slot, a second end of the second board body 702 is at a bottom section of the first slot, and a length of the first board body 701 is greater than a length of the second board body 702.

In one embodiment, the internal thread of the sleeve 4 is provided with a rubber plug 9, and a cross section of the rubber plug 9 is T-shaped. One end of the rubber plug 9 is outside the sleeve 4, and a surface of the rubber plug 9 facing away from the flashlight unit 6 is a curved surface. With the rubber plug 9, it is convenient for blocking the sleeve 4 and the water stains is prevented from entering the flashlight device 6 through the opening of the sleeve 4, which may affect the normal use of the flashlight device 6.

In one embodiment, a through hole 14 is provided inside the outer cover 2, a side of the through hole 14 is provided with a groove, a side of the groove is provided with a transparent rubber strip, and the through hole 14 is provided with phosphor therein. With such configuration, the light-emitting function of the ball is further enhanced, and the practicality of the ball in dark conditions is improved.

Figure 3:
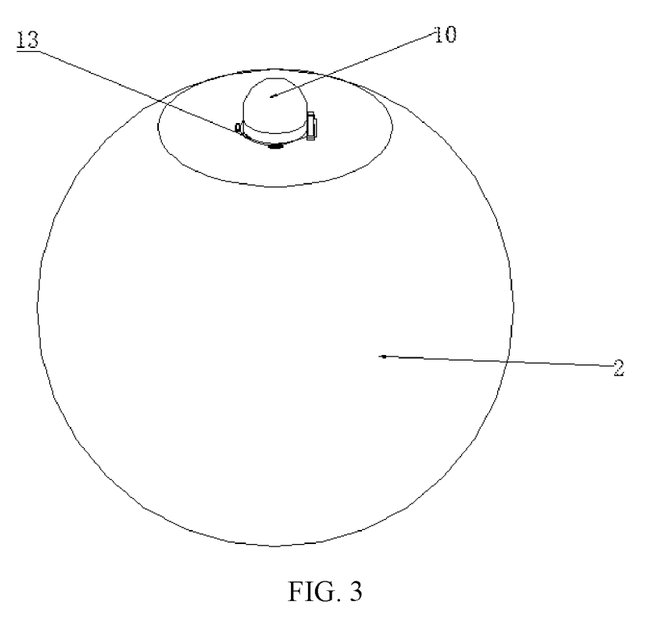
FIG. 3 is a structural schematic perspective view of a lamp bead according to an embodiment of the present invention.
Figure 4:
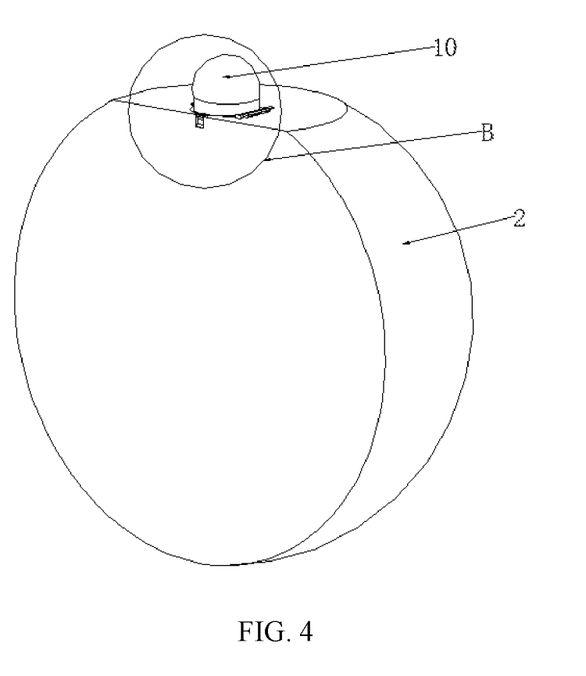
FIG. 4 is a structural schematic sectional view of a lamp bead according to an embodiment of the present invention.

In one embodiment, the outer cover 2 is provided with a circular slot 13 and a second rectangular slot 15, and the second rectangular slot (15) is located on a peripheral side of the circular slot 13. A button battery 29 is provided inside the circular slot 13, and an upper side of the button battery 29 is provided with a lamp bead 10. The peripheral side of the circular slot 13 is provided with a second fixing block 16, an upper side of the second fixing block 16 is provided with a buffer 12, and an output end of the buffer 12 is provided with a rubber plate 11.

In one embodiment, the second fixing block 16 is provided inside the second rectangular slot 15, and an upper side of the outer cover 2 is provided with a third fixing board 24 and a limiting block 26. A side of the third fixing board 24 is fixed with a latching strip 25, and a side of the latching strip 25 is inside the limiting block 26 and slidably fitted in the limiting block 26.

The material of the bladder 1 includes the following components by weight: 7-17 parts of natural rubber, 4-7 parts of SEBS, 15-25 parts of butadiene rubber, 6-9 parts of polyethylene glycol, 3-6 parts of silica, 2~4 parts of naphthenic oil, 1~2 parts of highly active zinc oxide, 0.7~1.1 parts of stearic acid, 0.2~0.4 parts of sulfur, 1.5~2.1 parts of modified rectorite powder, 0.9~1.4 parts of nano boron fiber, 0.7~1 parts of carbon fiber, 1.8~2.4 parts of modified Kevlar fiber, 0.5~0.8 parts of triallyl isocyanurate, and 0.6~0.9 parts of antioxidant.

Figure 5:
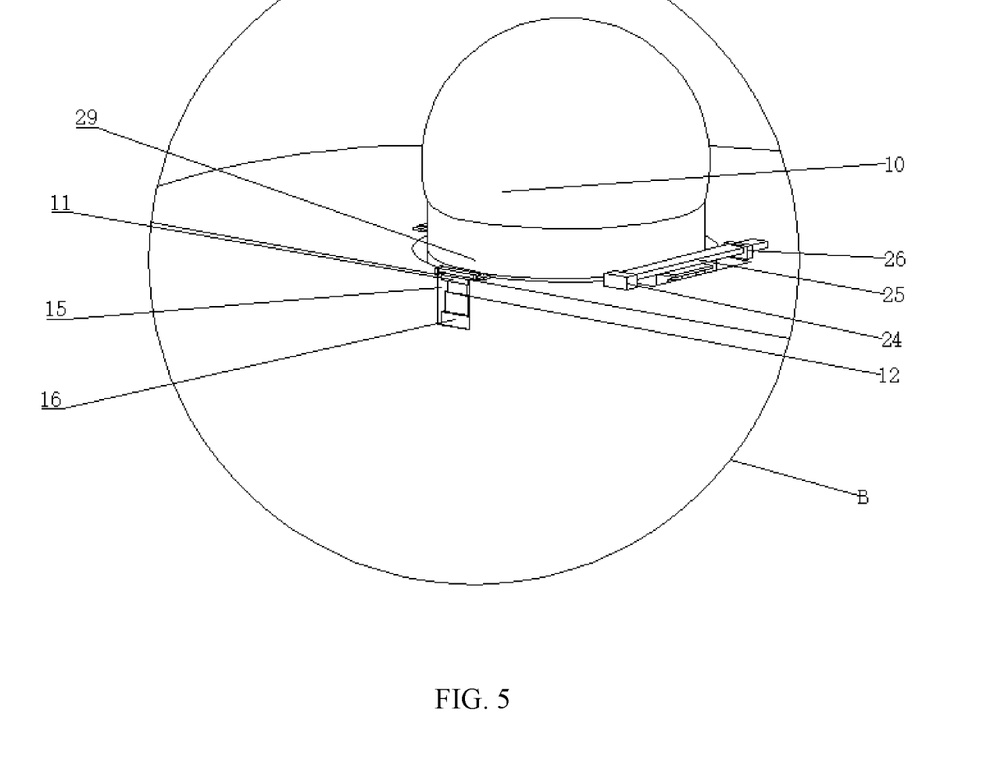
FIG. 5 is a structural schematic view of a region B in FIG. 1.

In one embodiment, a rectangular opening 27 is provided between the bladder 1 and the outer cover 2, a plurality of second circular openings 28 are provided in the outer cover 2 and are located at one side of the rectangular opening 27.

Figure 2:
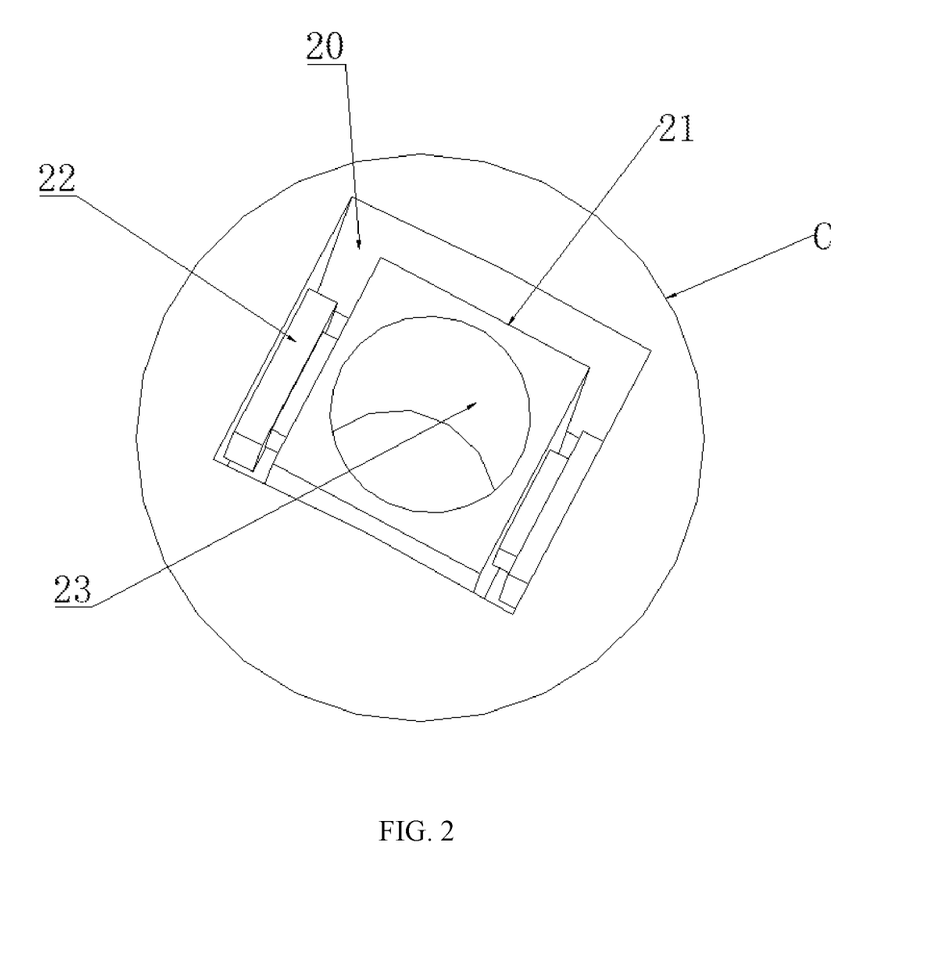
FIG. 2 is a structural schematic view of a region C in FIG. 1.

In one embodiment, the first fixing block 17 is provided with a first limiting slot therein, the first limiting slot is provided with a first rotating shaft, the telescopic device 19 is rotatably fitted on a peripheral side of the first rotating shaft, the gravity ball 18 is provided with a second limiting slot therein, the second limiting slot is provided with a second rotating shaft therein, and the output end of the telescopic device 19 is rotatably fitted on a peripheral side of the second rotating shaft.

In one embodiment, a method of manufacturing the above-described luminous ball is provided that may include the following operations.

In step 1, rubber is processed. The rubber is placed on an extrusion device for processing.

In step 2, the rubber is cut. After folding a rubber sheet for a plurality of times, centers of the rubber sheets are stuck with a plurality of reinforcing connecting lines, the rubber sheets are placed on a cutting mold, and the rubber sheets are cut, through the cutting mold, by using a pressing device.

In step 3, sticking of an air nozzle is performed. A hole is made on one of the rubber sheets having been cut, glue is applied on an edge of the hole, and the air nozzle is inserted into the hole.

In step 4, heating is performed. The rubber sheets are placed in a spherical cabin, and then the first fixing block 17 is fixed inside the rubber sheet. The rubber sheet in the spherical cabin is inflated by an inflator, and the rubber sheets in the spherical cabin are heated, such that the rubber sheet forms a bladder. In the process of processing the bladder, a corresponding space is reserved according to the shape of the bag 3, and then a corresponding device is installed in the bag 3.

In step 5, winding is performed. The bladder is placed on a winding device, and the winding device is caused to wrap nylon threads around the bladder.

In step 6, sticking of the outer cover is performed. A plurality of outer cover pieces 2 which have been cut in advance are placed in the spherical cabin, the wound bladder 1 is placed in the outer cover 2, and the bladder is inflated by using an inflator to cause the sleeve 4 of the spherical cabin to heat the outer cover 2 so that the outer cover 2 is sticked to the bladder 1.

In step 7, packing is performed. The processed ball is deflated, a compression device of the bag 3 is used for reducing air in the ball, and the ball is packed with a packing bag.

The luminous ball in the present invention may be any ball used in any scene, and the luminous ball can be a ball used in sports, or a fixed ball or a hanging ball for decoration.

What is claimed is:

1. A luminous ball, comprising: a bladder and an outer cover, wherein a plurality of first fixing blocks are provided inside the bladder, a side of each of the plurality of first fixing blocks is hinged with a telescopic device, output ends of the telescopic devices are hinged with a gravity ball, a first rectangular slot is provided inside the gravity ball, a retaining block is provided inside the first rectangular slot, a stopper is installed between the retaining block and the first rectangular slot, a first circular opening is provided inside the retaining block, and a positioning chip is installed inside the first circular opening;

an exterior side of the bladder is provided with a receiving chamber, an end of the receiving chamber is located inside the bladder, a sleeve is provided in the receiving chamber, and an inner side of the sleeve is provided an internal thread;

the internal thread of the sleeve is engaged with a flashing light device, an outer surface of the flashing light device is provided with an external thread, the outer surface of the flashing light device is provided with two first slots, each of the two first slots is provided with a V-shaped limiting paddle, the inner side of the sleeve, is provided with a positioning groove corresponding to the V-shaped limiting paddle, the V-shaped limiting paddle is slidably fitted in the positioning groove, and the two V-shaped limit paddles are symmetrically arranged on the outside of the flashing light device.

2. The luminous ball according to claim 1, wherein the V-shaped limiting paddle) comprises a first board and a second board body, a first end of the first board body and a first end of the second board body are engaged in a fixed manner, a second end of the first board body is close to an open section of the first slot, a second end of the second board body is at a bottom section of the first slot, and a length of the first board body is greater than a length of the second board body.

3. The luminous ball according to claim 1, wherein the internal thread of the sleeve is engaged with a rubber plug, a cross section of the rubber plug is T-shaped, one end of the rubber plug is outside the sleeve, and a surface of the rubber plug away from the flashing light unit is a curved surface.

4. The luminous ball according to claim 1, wherein a through hole is provided inside the outer cover, a side of the through hole is provided with a groove, a side of the groove is provided with a transparent rubber strip, and the through hole is provided with phosphor therein.

5. The luminous ball according to claim 1, wherein the outer cover is provided with a circular slot and a second rectangular slot, the second rectangular slot is located on a peripheral side of the circular slot, a button battery is provided inside the circular slot, an upper side of the button battery is provided with a light bulb, the peripheral side of the circular slot is provided with a second fixing block, an upper side of the second fixing block is provided with a buffer, and an output end of the buffer is provided with a rubber plate.

6. The luminous ball according to claim 1, wherein a second fixing block is provided inside the second rectangular slot, an upper side of the outer cover is provided with a third fixing board and a limiting block, a side of the third fixing board is fixed with a latching strip, and a side of the latching strip is inside the limiting block and slidably fitted in the limiting block.

7. The luminous ball according to claim 1, wherein material of the bladder comprises the following components by weight: 7-17 parts of natural rubber, 4-7 parts of SEBS, 15-25 parts of butadiene rubber, 6-9 parts of polyethylene glycol, 3-6 parts of silica, 2~4 parts of naphthenic oil, 1~2 parts of highly active zinc oxide, 0.7~1.1 parts of stearic acid, 0.2~0.4 parts of sulfur, 1.5~2.1 parts of modified rectorite powder, 0.9~1.4 parts of nano boron fiber, 0.7~1 parts of carbon fiber, 1.8~2.4 parts of modified Kevlar fiber, 0.5~0.8 parts of triallyl isocyanurate, and 0.6~0.9 parts of antioxidant.

8. The luminous ball according to claim 1, wherein a rectangular opening is provided between the bladder and the outer cover, a plurality of second circular openings are provided in the outer cover and are located at one side of the rectangular opening.

9. The luminous ball according to claim 1, wherein the first fixing block is provided with a first limiting slot therein, the first limiting slot is provided with a first rotating shaft, the telescopic device is rotatably fitted on a peripheral side of the first rotating shaft, the gravity ball is provided with a second limiting slot therein, the second limiting slot is provided with a second rotating shaft therein, and the output end of the telescopic device is rotatably fitted on a peripheral side of the second rotating shaft.

10. A method of manufacturing a luminous ball of claim 1, the method comprising:
   step 1, processing rubber: placing the rubber on an extrusion device for processing;
   step 2, cutting rubber: after folding a rubber sheet for a plurality of times, sticking a plurality of reinforcing connecting lines at centers of the rubber sheets, placing the rubber sheets on a cutting mold, and using a pressing device to cut the rubber sheets through the cutting mold;
   step 3, sticking an air nozzle: making a hole on one of the rubber sheets having been cut, applying glue on an edge of the hole, and inserting the air nozzle into the hole
   step 4, heating: placing the rubber sheets in a spherical cabin, then fixing the first fixing block inside the rubber sheet, using an inflator to inflate the rubber sheet in the spherical cabin, making the spherical cabin heat the rubber sheet, and making the rubber sheet into a bladder, wherein in the process of processing the bladder, a corresponding space is reserved according to the shape of the receiving chamber, and then a corresponding device is installed in the receiving chamber;
   step 5, winding: placing the bladder on a winding device and causing the winding device to wrap nylon threads on the bladder;
   step 6, sticking the outer cover: laying a plurality of outer cover pieces that have been cut in advance in the spherical cabin, placing the wound bladder in the outer cover, and inflating the bladder with an inflator to cause the sleeve of the spherical cabin to heat the outer cover so that the outer cover is stuck to the bladder; and
   step 7, packing: deflating the processed ball, causing a compression device of the receiving chamber to reduce air in the ball, and packing the ball with a packing receiving chamber.

\* \* \* \* \*